June 3, 1941.   P. A. MARSAL   2,244,016
PROCESS FOR MANUFACTURING DRY CELLS
Original Filed March 18, 1936
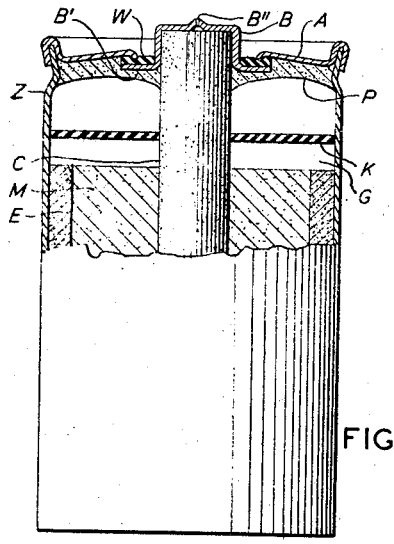
FIG. 1
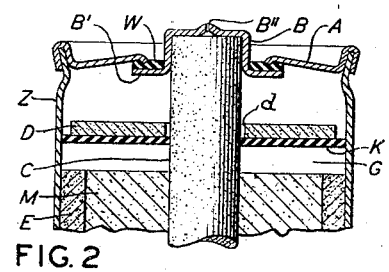
FIG. 2
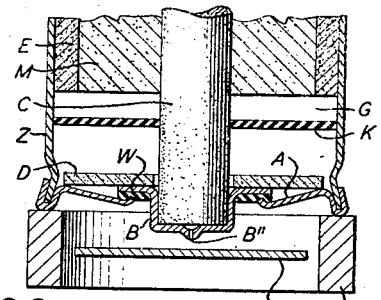
FIG. 3
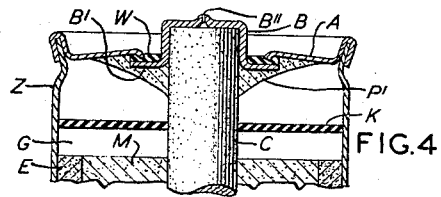
FIG. 4
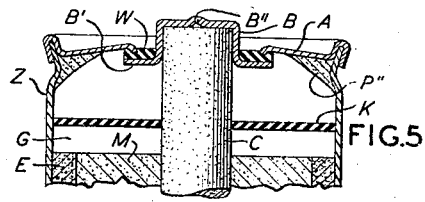
FIG. 5
FIG. 6
FIG. 7
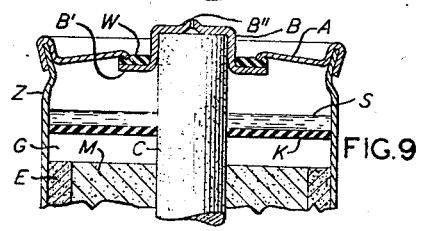
FIG. 9
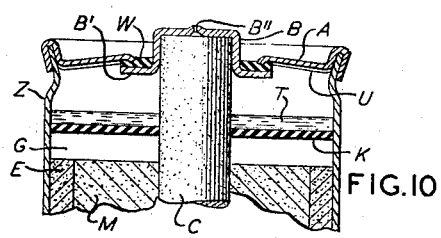
FIG. 10
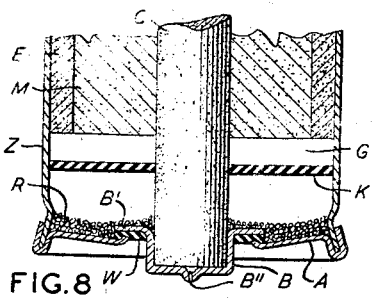
FIG. 8
INVENTOR
PAUL A. MARSAL
BY
ATTORNEY Patented June 3, 1941

2,244,016

UNITED STATES PATENT OFFICE 2,244,016

PROCESS FOR MANUFACTURING DRY CELLS

Paul A. Marsal, Lakewood, Ohio, assignor to National Carbon Company, Inc., a corporation of New York Original application March 18, 1936, Serial No. 69,503. Divided and this application March 30, 1938, Serial No. 198,815

13 Claims. (Cl. 136—133)

This invention relates to galvanic cells and, more particularly, to a procedure for applying an improved sealing means to so-called dry cells. The present application is a division of copending application Serial No. 69,503, filed March 18, 1936, now Patent No. 2,169,702, issued August 15, 1939.

It is important to retard or prevent the leakage and evaporation of moisture from dry cells, and to permit escape therefrom of gases generated therein. Formerly, a relatively thick body of wax composition was used to seal the dry cell; and, more recently, a much thinner closure, such as sheet metal, has been used instead of the wax seal. The thinner closure usually comprises an annular disc-like cover member which has its outer margin permanently and gas-tightly secured to the upper end of the zinc container electrode, and has its inner margin gas-tightly supported by the central carbon electrode. The carbon electrode preferably is sufficiently porous to vent gas generated in the cell and is treated with lubricating oil or other suitable composition to prevent loss of moisture through its pores. In the smaller or so-called flashlight size of cell, the top end of the carbon electrode carries and contacts with a brass cap having a flange to provide a bearing or support for the inner margin of the cover and for an electrically non-conductive member which insulates the cover from this cap and the carbon electrode. Compared with those having wax seals or closures, the cells provided with the thin closures are stronger, more uniform in performance and appearance, and have a considerably greater useful space within the cell for active material, in proportion to the external dimensions of the cell.

In some types of cells, such as the metal-sealed cells for flashlight service, the usefulness of such extra space has been severely limited because the flange of the brass cap is exposed inside the cell. Under certain conditions the various salts, which partly compose the cell electrolyte, creep up the inside surface of the zinc can and across the inner surface of the metal cover, making contact with the cover and the flange of the brass cap and resulting in deterioration and destruction of the cell. The creepage of these salts is especially harmful at elevated temperatures and humidities, such as are common in tropical climates. For this reason it has been necessary to retain as an air space a considerable part of the volume gained by the use of the thinner seal and, in some instances, to provide special means to increase the length of the creepage path.

Accordingly, the principal objects of this invention are to overcome the above-described objectionable features of dry cells having thin covers, especially those comprising sheet metal; to provide a cell in which a substantial portion of the extra space, made available by the thin cover, may be safely used to increase the volume of active material in the cell; to provide a cell in which metal parts of the closure, especially the gap between such parts, are internally protected against contact with active material in the cell; to provide a cell which is more effectively sealed against loss of moisture; and to provide a cell which will more successfully withstand deterioration under various conditions of temperature and humidity throughout the world, particularly in or near the tropics and in humid localities. These and other objects and the novel features of this invention will be apparent from the following description taken with the accompanying drawing, in which:

Fig. 1 is a view, partly in section, illustrating a dry cell embodying this invention;

Figs. 2 and 3 are sectional views illustrating steps in the process of manufacturing the cell shown in Fig. 1;

Figs. 4 and 5 are sectional views similar to the top part of Fig. 1, illustrating other cells embodying this invention;

Figs. 6 and 7 are perspective views of the annular bodies of plastic material used in manufacturing the cells shown in Figs. 4 and 5, respectively;

Fig. 8 illustrates a step in another process of manufacturing a cell embodying this invention; and Figs. 9 and 10 are views illustrating steps in other processes of making dry cells embodying this invention.

According to this invention, an annular body or mass of plastic sealing material, which is moisture repellant and electrically non-conductive, is applied to interior surfaces of the cell closure and to interior portions of the electrode surfaces adjoining the closure, after the closure has been secured to the cell. The composition of the plastic material is such that, when properly deposited and set in sealing position, it firmly adheres to these internal surfaces and resists any tendency of the electrolyte salts or active material to creep along or across its surface to short circuit or otherwise damage the cell. The plastic material preferably covers the entire interior surface of the closure, including the joints between parts of the closure and the joints between the closure and the carbon and zinc electrodes. However, in some instances it is sufficient to apply the plastic material so that it bridges and internally covers only the joint between the flange of the brass cap and the inner margin of the cover member resting thereon, as well as the joint between the carbon electrode and the brass cap; or only the joint between the cover member and the zinc can. The relatively thick solid adherent body of plastic material thus protects and insulates the interior surface of the closure during the full life of the cell, particularly the adjoining portions of the cover and the brass cap, by preventing access of electrolyte thereto; and said material provides an electrolyte anti-creepage means which also more effectively seals the cell at the joints between the closure and the electrodes, preventing loss of moisture from the cell. By this construction, deterioration of the cell is greatly retarded, and a considerably larger volume of active material may be safely used in the cell.

The several figures of the drawing illustrate the invention applied to a typical dry cell of the size used for flashlight service but the invention is not limited to this type of cell. As shown, the cell comprises a cylindrical zinc can or container electrode Z; a cylindrical carbon electrode member C disposed centrally within and spaced from the outer electrode Z; a cylindrical body of depolarizing and active material or mix M in which the inner end of the electrode member C is embedded; and a bibulous spacing material E between the mix M and the electrode Z. The spacing material E may consist of suitable paste or absorbent material such as paper, and contains the complete electrolyte needed during the full life of the cell. A suitable electrolyte, such as an aqueous solution of zinc chloride and ammonium chloride, may be used. The electrode member C preferably consists of a solid rod of porous carbon treated with a moisture repellant composition, so that gas generated in the cell will vent through this electrode to the atmosphere but substantially no moisture will escape from the inside of the cell. Otherwise, the parts just described may be of the usual or any preferred type. An annular collar K of stiff paperboard or other suitable material is disposed in the gas space G at a substantial distance above the mix M and is rigidly held in place by the frictional engagement of its edges with the inside surfaces of the electrodes Z and C.

The closure of the cell may comprise a relatively thin annular cover member A and a metal cap B. The cap B may be a cup-shaped member of brass or other suitable sheet metal fitting the upper end of the electrode member C, and desirably is provided with an out-turned annular flange B' at its lower edge and a vent hole B" opposite the top of the electrode C. The cover A may consist of relatively rigid but resilient sheet material such as metal, paperboard, fiberboard or molded plastic material; and as shown it consists of thin sheet iron or steel. The outer margin of the cover A preferably is permanently and gas-tightly secured to the upper end of the electrode Z, as by tightly rolling or spinning the margin of the cover A over the circular edge of the can Z. The inner margin of the cover A is supported by the electrode member C, since it presses firmly against an annular washer W of moisture-proof and electrical insulating material which is carried by the flange B' of the cap B that is mounted on the electrode C.

As previously explained, active material of the cell often contacts with the interior surfaces of the closure and the joints between the closure and the electrodes, deteriorating or destroying the cell. As shown in Fig. 1, this is prevented by applying a body or mass P of suitable material to the entire interior surface of the closure and to the joints between the closure and the electrodes, by melting or fusing and depositing said mass into sealing position after the closure has been secured to the zinc can. The mass P may consist solely of thermoplastic material which is both moisture-proof and electrically non-conductive and, when set, adheres firmly to the interior surfaces of the cover and the adjoining interior surfaces of the electrodes. It will be seen that the plastic material P bridges the gap between the flange B' and the cover A, thereby effectively resisting access of electrolyte salts to these parts. In addition, the joint between the cover A and the electrode Z and the joint between the cap B and the electrode C are completely and gas-tightly sealed to more effectively prevent loss of cell moisture and resist creepage of electrolyte salts through or across these joints.

Various procedures may be followed in applying the unitary body or mass P to manufacture an improved cell embodying this invention. As shown in Figs. 2 and 3, before the cover A and cap B are secured in place a ring or annular disc D of thermoplastic material is placed on the collar K surrounding the electrode E within the cell. The diameter of the central hole d of the disc D is somewhat greater than the diameter of the electrode C so that the disc D will slide freely vertically along the electrode C. The closure is then secured to the cell in the manner already described. The cell is then inverted, whereupon the disc D will be guided by the electrode C and drop down into horizontal contact with portions of the interior surface of the closure. Sufficient heat is then applied to the closure of the cell to melt the disc D and cause it to flow over and cover the entire interior surface of the closure and the joints thereof, to produce the adherent protective mass P. The cell is retained in inverted position until the thermoplastic material solidifies in contact with interior surface portions of the cell and the cell closure or cover member.

In some instances it will be sufficient to apply an adherent protective mass only to the gap between the flange B' and the cover A and between the flange B' and the electrode C, as shown at P' in Fig. 4. Here, a thermoplastic disc D', as shown in Fig. 6, having the same internal diameter as, but a smaller external diameter than, the disc D, may be used to produce the protective mass P'. Similarly, it will be sufficient in some constructions to apply a protective mass only to the joint between the cover A and the zinc can Z, as shown at P" in Fig. 5. Here a thermoplastic disc D", as shown in Fig. 7, having the same external diameter as, but a larger internal diameter than, the disc D, may be used to produce the protective mass P". The masses P' and P" prevent salt creepage to the flange B' and also effectively seal the outer joint of the closure, so that less precision in the closing operation is necessary. The use of the protective mass P" also leaves the inner margin of the cover A free to be lifted off the washer W, to serve as an auxiliary vent to release excessive gas pressure generated in the cell.

The same general procedure, as that described in connection with Figs. 2 and 3 and the use of the disc D, is followed in inserting, displacing and using the discs D' and D'' to produce the masses P', P'', respectively, except that the fusing heat may be more localized in applying the latter. For example, in applying the mass P'' the localized heating may be concentrated upon the outer seam or joint of the closure and the electrode Z.

The discs D, D' and D'' may consist of any sfluitable thermoplastic material that may be fused or melted at moderately elevated temperatures and will readily solidify at ordinary room temperatures to produce a protective mass which is adherent after melting and solidification, is electrically non-conductive, and resistant to moisture and creepage of electrolyte salt. A thermoplastic composition which has been found to be satisfactory is as follows:

Soft asphalt_____ 5 parts by weight
Montan wax_____ 5 parts by weight
Asbestine (talc)_____ 4 parts by weight
White paraffin_____ 1 part by weight
Tung oil_____ 2 cc. per 100 grams of the above materials Other suitable materials are: a mixture of gilsonite selects with soft asphalt; chlorinated paraffin; ceresin wax; a mixture of rosin and rubber; and a mixture of stearic acid, tallow, candelilla wax and petrolatum.

For a typical flashlight dry cell 1¼ inches diameter by 2¼ inches high, a thermoplastic disc one-sixteenth inch thick and seven-eighths inch in diameter with a center hole eleven-thirty-seconds inch in diameter is satisfactory for disc D.

Various means, such as an open flame, electrical heating as by induction or high frequency, or exposure to radiant heat, may be used to apply heat to the closure or to the top part of the cell to melt the internal thermoplastic disc. As shown in Fig. 3, radiant heat preferably is used and may be applied by an electrically heated body H consisting of a ribbon of metal resistance alloy such as nichrome. A suitable spacing member H' may support the cell at the proper distance above the heater H. An exposure of about 45 seconds, at a distance of about one-fourth inch between the cover of the cell and the radiant body H heated to about cherry red, has been found satisfactory to melt a properly located disc of the type of disc D. Obviously, the heating interval will vary with various factors such as the nature of the thermoplastic material, the temperature of the cell, the type of closure, etc.

The use of the thermoplastic material in ring or disc form affords distinct advantages in handling and in controlling the quantity and distribution of material. However, in some instances, e. g., for less precise distribution of the protective mass, thermoplastic material in loose, freely-movable pulverized or pellet form may be placed on the collar K in the cell. Such pellet material R is shown in the inverted cell of Fig. 8, ready to be heated as previously described to produce a relatively thick solid adherent protective mass similar to the mass P of Fig. 1.

The procedure illustrated in Fig. 9 has also been found practicable. Here a molten sealing material S of the kind already described is poured onto the collar K just prior to the seaming or closing operation. The closure is then quickly spun in place and the cell is quickly inverted. The molten material then flows down and completely covers the interior surfaces to be protected and, upon cooling to room temperature, solidifies and produces a solid adherent protective mass similar to the protective mass P of Fig. 1.

In some instances, instead of using a thermoplastic material it is desirable to use materials which will polymerize to produce the desired adherent coating or protective mass. As shown in Fig. 10, a suitable polymerizable material T may be deposited or poured onto the collar K just prior to the closing operation. After the closure has been secured in place, the cell is inverted and aged in the inverted position until the polymerizing material has solidified to produce a protective mass similar to the coating or mass P of Fig. 1. For this purpose it has been found satisfactory to use a tung oil which is polymerized by ferric chloride—a practical formula being: tung oil, 100 grams; ferric chloride, 6 grams; and acetone, 2 grams. If the materials which form the protective mass react too quickly, they may be kept separate until after the cell has been closed and inverted. This may be done by applying one of the reactive constituents to the inner surface of the cover, as indicated at U in Fig. 10. When the cell has been closed and is inverted, the other reactive constituent, such as T, will be deposited upon the constituent U, whereupon a reaction will occur to produce a protective mass similar to the mass P of Fig. 1.

While numerous embodiments of this invention are disclosed herein, it will be understood other variations and changes are possible without departing from the principles of the invention or sacrificing its advantages.

What is claimed is:

1. In a process of producing a dry cell in which, during assembling thereof, a central carbon electrode is inserted into a metal container electrode, active material and a complete electrolyte are disposed within said metal container electrode between the latter and said central carbon electrode, and a cover member has one margin thereof permanently secured to said metal container electrode and has another margin thereof supported by said central carbon electrode, the steps of loosely disposing, within said dry cell above said electrolyte and active material and prior to permanently securing said cover member to said metal container electrode, material adapted to solidify into a moisture-repellent, electrically non-conductive and electrolyte-creepage-resistant composition; inverting said cell, after permanently securing said cover member to said metal container electrode, to displace said material adjacent to the inner side of said cover member; and causing said material to flow against and solidify in permanent contact with an annular interior surface portion of said cover member and an adjoining annular interior surface portion of at least one of said electrodes, so as to produce an annular solidified mass of said composition which during the full life of the cell permanently internally bridges and seals the joint between said surface portions and resists creepage of electrolyte to and across said joint.

2. Process of sealing a dry cell and inhibiting creepage of electrolyte material to the cell closure and to the joints between said closure and the cell electrodes, said process including the step of introducing within the cell a freely-movable mass of solid thermoplastic water-repellant material, rigidly securing a cell closure to the cell, and thereafter moving the said material into contact with the closure and melting the said material, thereby covering the interior of said joints and the entire interior surface of said closure with an adherent sealing composition adapted to resist creepage of electrolyte material.

3. A process of making a galvanic cell, which includes the steps of disposing freely movable, moisture-repellant, electrically non-conductive, thermoplastic material in solid form within said cell; securing a closure member to the open top of said cell; inverting said cell to displace said material into contact with an internally exposed portion of said closure member; and heating said material to melt the same and cause it to flow over and cover at least a portion of the interior surface of the closure.

4. In a process of producing a dry cell in which, during assembly thereof, an electrode member is inserted into a container electrode, active material is disposed within the said container electrode between the latter and the said electrode member, and a cover member has one margin thereof permanently secured to said container electrode and has another margin thereof supported by said electrode member, the step of disposing, within the container electrode above the said active material and prior to permanently securing the cover member to the container electrode, an annular disc of moisture-repellent and electrolyte-creepage-resistant thermoplastic material, said annular disc having an external diameter slightly less than the internal diameter of said container electrode and an internal diameter considerably greater than the diameter of said electrode member, together with the steps, subsequent to permanently securing the cover member to the container electrode, of inverting the cell and then heating the thermoplastic material and flowing the resultant molten material upon the interior surface portion of the cover member adjacent the container electrode and the adjacent interior surface portion of the container electrode, thereby forming an adherent coating upon said interior surface portions.

5. In a process of producing a dry cell in which, during assembly thereof, an electrode member is inserted into a container electrode, active material is disposed within the said container electrode between the latter and the said electrode member, and a cover member has one margin thereof permanently secured to said container electrode and has another margin thereof supported by said electrode member, the step of disposing, within the container electrode above the said active material and prior to permanently securing the cover member to the container electrode, an annular disc of moisture-repellent and electrolyte-creepage-resistant thermoplastic material; said annular disc having an internal diameter slightly greater than the diameter of said electrode member and an external diameter considerably less than the internal diameter of said container electrode, together with the steps, subsequent to permanently securing the cover member to the container electrode, of inverting the cell and then heating the thermoplastic material and flowing the resultant molten material upon the interior surface portion of the cover member adjacent said electrode member and the adjacent interior surface portion of said electrode member, thereby forming an adherent coating upon said interior surface portions.

6. In a process of producing a dry cell in which, during assembly thereof, an electrode member is inserted into a container electrode, active material is disposed within the said container electrode between the latter and the said electrode member, and a metal cover member has one margin thereof rigidly secured to said container electrode and has another margin thereof supported by said electrode member but insulated therefrom, the step of loosely disposing moisture-resistant electrically non-conductive thermoplastic material in solid form within the container electrode above the said active material prior to securing the cover member to the container electrode, together with the step, subsequent to securing the cover member to the container electrode, of concurrently heating the cover member and the thermoplastic material and flowing the resultant molten material upon the interior surface of the cover member, thereby forming an adherent coating upon the latter.

7. In a process of producing a dry cell in which, during assembly thereof, an electrode member is inserted into a container electrode, active material is disposed within the said container electrode between the latter and the said electrode member, and a metal cover member has one margin thereof rigidly secured to said container electrode and has another margin thereof supported by said electrode member but insulated therefrom, the step of loosely disposing moisture-resistant electrically non-conductive thermoplastic material in solid form within the container electrode above the said active material prior to securing the cover member to the container electrode, together with the step, subsequent to securing the cover member to the container electrode, of concurrently heating the cover member and thermoplastic material and flowing the resultant molten material upon the interior surface of the cover member and adjacent portions of the container electrode, thereby forming an adherent coating upon the said interior surface, which coating bridges the joint between the cover member and the container electrode.

8. In a process of producing a dry cell in which, during assembly thereof, an electrode member is inserted into a container electrode, active material is disposed within the said container electrode between the latter and the said electrode member, and a metal cover member has one margin thereof rigidly secured to said container electrode and has another margin thereof supported by said electrode member but insulated therefrom, the step of loosely disposing moisture-resistant electrically non-conductive thermoplastic material in solid form within the container electrode above the said active material prior to securing the cover member to the container electrode, together with the step, subsequent to securing the cover member to the container electrode, of concurrently heating the cover member and thermoplastic material and flowing the resultant molten material upon the interior surface of the cover member and adjacent portions of the said electrode member, thereby forming an adherent coating upon the said interior surface and bridging the joint between the cover and the said electrode member.

9. In a process of producing a dry cell in which, during assembly thereof, an electrode member is inserted into a container electrode, active material is disposed within the said container electrode between the latter and the said electrode member, and a metal cover member has one margin thereof rigidly secured to said container electrode and has another margin thereof supported by said electrode member but insulated therefrom, the step of loosely disposing moisture-resistant electrically non-conductive thermoplastic material in solid form within the container electrode above the said active material prior to securing the cover member to the container electrode, together with the steps, subsequent to securing the cover member to the container electrode, of inverting the cell to deposit the said thermoplastic material on the inner surface of the cover member, and thereafter applying heat to at least a selected portion of the cover member and to the thermoplastic material, thereby melting the said material and forming an adherent coating thereof upon the said surface of the cover member and adjacent portions of the container electrode and electrode member, and thereafter discontinuing the said heating whereby the molten material solidifies while maintaining the cell in inverted position.

10. In a process of producing a dry cell in which, during assembly thereof, an electrode member is inserted into a container electrode, active material is disposed within the said container electrode between the latter and the said electrode member, and a gas space is provided in said container electrode above said active material; the step of disposing a collar of stiff material in said gas space above and in spaced relation to said active material and in frictional engagement with said electrode member and said container electrode; pouring a molten moisture-repellent and electrolyte-creepage-resistant material onto said collar, said material being capable of existing in solid form under the conditions of use of the cell; quickly securing a closure to the open top of said cell; inverting said cell to displace said material into contact with the interior surface portion of said closure and adjoining interior surface portions of said electrode member and said container electrode; and retaining said cell in its inverted position until said material solidifies in contact with said interior surface portions.

11. Process of making a galvanic cell, which includes the steps of disposing within an open-top cell a mixture of chemically reactive materials adapted to react and form a solidifiable, electrically non-conductive, moisture-resistant composition within said cell, securing a closure to the open top of said cell; inverting said cell to displace said composition onto the interior surface of said closure and initiating reaction between the said materials, and completing the said reaction while maintaining the cell inverted, thereby solidifying such reacted materials in the form of a body adherent to the said inner surface of the closure.

12. In a process of producing a dry cell in which, during assembly thereof, a central electrode is inserted into a container electrode, electrolyte and active material are disposed within said container electrode between the latter and said central electrode, and a cover member has one margin thereof permanently secured to said container electrode and has another margin thereof supported by said central electrode, the steps of disposing thermoplastic material within said container electrode above said electrolyte and active material and prior to permanently securing said cover member to said container electrode, such thermoplastic material being moisture repellent and resistant to electrolyte creepage; thereupon, but after said cover member has been permanently secured to said container, inverting the cell; and then heating said thermoplastic material to melt the latter and flow such molten material into contact with an interior surface portion of said cover member and an adjoining interior surface portion of one of said electrodes, whereby such molten material, upon cooling and solidification, internally bridges and seals the joint between such surface portions and resists creepage of electrolyte to and across said joint.

13. In a process of producing a dry cell in which, during assembly thereof, an inner electrode is inserted into a metal container electrode, electrolyte and active material are disposed within said container electrode between the latter and said inner electrode, and a metal cover member has one margin thereof permanently secured to said container electrode and has another margin thereof supported by said inner electrode, the steps of disposing, within said container electrode above said active material and prior to permanently securing said cover member to said container electrode, a displaceable body of moisture-repellent and electrolyte-creepage-resistant thermoplastic material; thereupon, but after said cover member has been permanently secured to said container electrode, inverting the cell to displace said material into contact with said cover member; then heating said cover member and said thermoplastic material to melt the latter and flow such molten material into contact with an interior surface portion of said cover member and an adjoining interior surface portion of one of said electrodes; and finally permitting such molten material to cool and solidify while the cell remains inverted, whereby said material internally bridges and seals the joint between such surface portions and resists creepage of electrolyte to and across said joint.

PAUL A. MARSAL.